Patented July 27, 1948

2,446,115

UNITED STATES PATENT OFFICE 2,446,115

CREAMING OF SYNTHETIC RUBBER LATICES

Edward C. Svendsen, Mishawaka, Ind., assignor to United States Rubber Company, New York, N. Y., a corporation of New Jersey No Drawing. Application January 11, 1945, Serial No. 572,425

8 Claims. (Cl. 260—93)

This invention relates to improvements in the creaming of synthetic rubber latices.

Synthetic rubber latices, as is known, may be prepared by the emulsion polymerization in aqueous medium of butadienes-1,3 or mixtures of butadienes-1,3 with other polymerizable compounds capable of forming copolymers with butadienes-1,3. Such aqueous emulsion polymerizates, or synthetic rubber latices, generally have a solids content from 20 to 35%, and may be creamed by the addition of a hydrophilic colloidal creaming agent, such as is used for creaming natural rubber latex, which will cause the dispersion on standing to separate into a polymer-rich fraction and a polymer-poor fraction, which fractions may be separated from each other by simple mechanical means such as decantation, drawing off, and the like. The concentration of such polymer-rich or cream fractions will vary from 40% or less to a maximum of about 48% solids. It is desired for many operations to further increase the solids concentration of the polymer-rich portion.

By the present invention, there is obtained an increase in the concentration of synthetic rubber in the polymer-rich or cream fraction in the creaming of synthetic rubber latices with hydrophilic colloidal creaming agents.

In carrying out the present invention, the pH of the synthetic rubber latex is reduced to between 4.5 and 6.5 without irreversibly coagulating the latex and the pH is then raised to above 9 before creaming with the hydrophilic colloidal creaming agent. This greatly increases the solids content of the polymer-rich fraction. The latex may be prevented from irreversibly coagulating on reduction of the pH to between 4.5 and 6.5 by the presence of sufficient conventional stabilizing agent to protect the dispersion on the acid side. There may be present sufficient residual stabilizer from the preparation of the latex, or additional amounts may be incorporated in the latex where necessary. The pH of the latex may be reduced to between 4.5 and 6.5 by first adding an ammonium salt, such as ammonium chloride or ammonium acetate to the synthetic rubber latex, followed by the addition of formaldehyde which combines with the ammonia of the salt to form hexamethylene tetramine, freeing the acid from the ammonium salt in situ. After reducing the pH to between 4.5 and 6.5, the pH may then be raised by the addition of any alkali material such as fixed alkali, ammonia or amine. The applicant prefers to add a volatile base so that this step will not introduce materials which will remain in a dried latex film and which may be undesirable by virtue of water absorbing properties, as is the case with residual fixed-alkali salts in latex films. The applicant has found, however, that volatile amines, that is, amines having a boiling point below 160° C., are preferable to ammonia since these amines give a higher concentration of synthetic rubber in the polymer rich fraction than does ammonia. Examples of such volatile amines, which will be driven off at drying or vulcanizing temperatures, are methylamine, ethylamine, dimethylamine, diethylamine, trimethylamine, triethylamine, propylamine, dipropylamine, isopropylamine, diisopropylamine, butyl primary amines, amyl primary amines, hexyl primary amines, cyclohexylamine, piperidine, 1-methyl-piperidine, 2-pipecoline, 3-pipecoline, 4-pipecoline, and such mixed amines as methyl ethylamine, methyl propylamine, methyl butylamine, and methyl diethylamine.

The hydrophilic colloidal creaming agent may be the conventional vegetable mucilages used in the creaming of natural latex, for example, alginates, locust seed or carob bean gum, pectates, Karaya gum, Irish moss, and the like. These vegetable mucilages may be used in amounts between .05 and 1% based on the water phase of the synthetic rubber latex similarly to the creaming of natural rubber latex. The hydrophilic colloidal creaming agent may be added to the latex before or after the pH is reduced to between 4.5 and 6, and then raised to above 9, providing of course, the actual creaming operation is not made to take place until the pH of the latex has been reduced and then raised again according to the present invention.

In the preparation of the synthetic rubber latex, as is known, polymerizable monomeric compounds are emulsified in an aqueous medium by means of an emulsifying agent, such as a soap or other surface active agent, and the polymerization is made to take place generally at elevated temperatures in the presence of a catalyst and other regulating materials. Examples of such polymerizable material are the various butadienes-1,3, for example, butadiene-1,3, methyl-2-butadiene-1,3 (isoprene), chloro-2-butadiene-1,3 (chloroprene), piperylene, 2,3-dimethyl-butadiene-1,3. The polymerizable material as known may be a mixture of such a butadiene-1,3 with another polymerizable compound which is capable of forming a rubber copolymer with butadienes-1,3, for example, up to 70% of such mixture of a compound which contains a $CH_2=C<$ group where at least one of the disconnected valences is attached to an electroactive group, that is, a group which substantially increases the electrical dissymmetry or polar character of the molecule. Examples of compounds which contain a $CH_2=C<$ group and are copolymerizable with butadienes-1,3 are aryl olefins, such as styrene, and vinyl naphthalene, the alpha methylene carboxylic acids, and their esters, nitriles and amides, such as acrylic acid, methyl acrylate, methyl methacrylate, acrylonitrile, methacrylonitrile, methacrylamide; isobutylene; methyl vinyl ether; methyl vinyl ketone; vinylidene chloride. Present day commercial synthetic rubbers of the above types are polymerized chloro-2-butadiene-1,3, known as neoprene or GRM rubber, copolymers of butadiene-1,3 and styrene, known as Buna S or GRS rubber, and copolymers of butadiene-1,3 and acrylonitrile, known as Buna N or GRN rubber.

Various known stabilizers will prevent the irreversible coagulation of the synthetic rubber latex on reduction of the pH between 4.5 and 6.5. Soaps are relatively poor protectives on the acid side, even at the higher pH's, but various other types of stabilizers are commonly used to protect dispersions of various water insoluble materials at pH's below 7. One type of such stabilizers are compounds having the general formula $$R-SO_2-M$$

where M represents a radical from the group consisting of alkali metal hydrogen and ammonium, and R represents an organic radical containing at least one group having at least more than 8 carbon atoms. Examples of such compounds are:

(1) Alkyl sulphates, for example, various compounds from $C_8H_{17}OSO_3Na$ to $C_{18}H_{37}OSO_3Na$, known commercially under the trade names "Aquarex D," "Duponol WA," "Duponol 80," "Gardinol," and "Orvus WA."

(2) Alkyl sulphonates, as for example, the compounds $C_{12}H_{25}SO_3Na$ and $C_{16}H_{33}SO_3Na$, dodecyl sodium sulphonate and cetyl sodium sulphonate.

(3) Sulphonated and sulphated mixed ethers of long and short chain aliphatic groups, as for example, $C_{17}H_{33}-O-C_2H_4-SO_3Na$ (Nacconol LA), and $C_{17}H_{33}-O-C_2H_4-O-SO_3Na$.

(4) Sulphonated and sulphated alkyl esters of long chain fatty acids, as for example

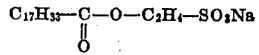

(Igepon A, Arctic Syntex A), and

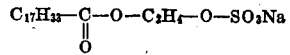

(5) Sulphonated alkyl substituted amides of long chain fatty acids, as for example,

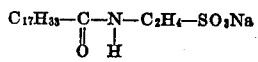

(Igepon T, Arctic Syntex T), and

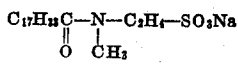

(Igepon TF).

(6) Alkylated aryl sulphonates, as for example, isopropyl naphthalene sodium sulphonate (Nekal A); and dodecyl benzene sodium sulphonate (Nacconol NR).

(7) Hydroaromatic sulphonates, for example, octa-hydro-anthracene sodium sulphonate (Octaton), and tetra-hydro-naphthalene sodium sulphonate (Alkanol S).

(8) Alkyl sulfosuccinates, for example, the commercial stabilizer Aerosol OT having the formula

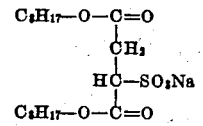

Another common type of stabilizers are the reaction products of ethylene oxide with an aliphatic alcohol or an aliphatic acid having more than 8 carbon atoms, or a phenol, for example, $C_{17}H_{33}CH_2(OC_2H_4)_nOH$ where $n$ may be around 10 to 20 (Emulphor O);

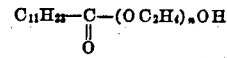

where $n$ may be around 10 to 20 (Emulphor A); and

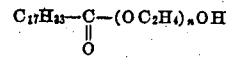

where $n$ may be around 10 to 20 (Emulphor AG);

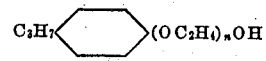

where $n$ may be around 10 to 20 (Igepal C).

If the synthetic rubber latex was originally made with a conventional stabilizer, such as those above, which are protectives on both alkaline and acid sides, it may not be necessary to add further stabilizer when reducing the pH of the latex to between 4.5 and 6.5, according to the present invention. However, most commercial synthetic rubber latices are alkaline soap emulsion polymerizates and since soaps are not particularly effective as protectives on the acid side, it will be desirable in such cases to add some conventional protective, such as those above referred, before reducing the pH of the latex to between 4.5 and 6.5. Such protection of dispersions on the acid side of neutrality is well known.

The following is illustrative of the invention:

454 parts (wet weight) of commercial 22% solids Buna S latex (copolymer of 75 parts by weight of butadiene-1,3 and 25 parts by weight of styrene with 5 parts by weight commercial fatty acid soap based on the polymerizable material as an emulsifying agent) was stabilized against coagulation on reduction of pH by the addition of 10 parts wet weight of a 10% solution of Aquarex D, a commercial stabilizer (dodecyl sodium sulfate). To the thus treated latex was added 45 parts wet weight of a 10% aqueous ammonium chloride solution and 3.6 parts wet weight of a 28% aqueous ammonium hydroxide. 63 parts wet weight of 10% aqueous formaldehyde was added, reducing the pH of the latex to 6.1. To various portions of the thus treated latex were added 3, 4 and 5 parts wet weight of 25% aqueous ammonia, and to other portions of the latex were added similar amounts of 25% aqueous dimethylamine, the pH in each case being raised to above 9. To each portion was added 100 parts wet weight of a 2% ammonium alginate solution and the portions were allowed to cream for 48 hours. The highest solids content of the creams of the samples to which the various amounts of ammonia had been added to raise the pH to above 9 was 53% solids. The highest solids content of the creams where dimethylamine was added was 59% solids. All these creaming results are much higher concentrations than obtainable by conventional creaming methods, and the addition of amine to raise the pH to above 9 gave a higher concentration of solids in the cream than where ammonia was added to raise the pH from between 4.5 and 6.5 to above 9.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The improvement in the creaming with a vegetable mucilage of an aqueous emulsion polymerizate of polymerizable material selected from the group consisting of butadienes-1,3 and mixtures of butadienes-1,3 with other polymerizable compounds containing a $CH_2=C<$ group and capable of forming copolymers with butadienes-1,3 which comprises adding to the aqueous emulsion polymerizate an ammonium salt which frees acid in-situ in the presence of formaldehyde and adding formaldehyde to reduce the pH of the aqueous emulsion polymerizate to between 4.5 and 6.5 without irreversibly coagulating the same, raising the pH to above 9 by addition of an alkali material selected from the group consisting of fixed alkalis, ammonia and volatile amines having boiling points below 160° C., and creaming with a vegetable mucilage.

2. The improvement in the creaming with a vegetable mucilage of an aqueous emulsion polymerizate of polymerizable material selected from the group consisting of butadienes-1,3 and mixtures of butadienes-1,3 with other polymerizable compounds containing a $CH_2=C<$ group and capable of forming copolymers with butadienes-1,3 which comprises adding to the aqueous emulsion polymerizate an ammonium salt which frees acid in-situ in the presence of formaldehyde and adding formaldehyde to reduce the pH of the aqueous emulsion polymerizate to between 4.5 and 6.5 without irreversibly coagulating the same, raising the pH to above 9 by addition of a volatile amine having a boiling point below 160° C., and creaming with a vegetable mucilage.

3. The improvement in the creaming with a vegetable mucilage of an alkaline aqueous emulsion polymerizate of a mixture of butadiene-1,3 and a compound which contains a $CH_2=C<$ group and is copolymerizable with butadiene-1,3 which comprises adding to the aqueous emulsion polymerizate an ammonium salt which frees acid in-situ in the presence of formaldehyde and adding formaldehyde to between 4.5 and 6.5 without irreversibly coagulating the same, raising the pH to above 9 by addition of a volatile amine having a boiling point below 160° C., and creaming with a vegetable mucilage.

4. The improvement in the creaming with a vegetable mucilage of an alkaline aqueous emulsion polymerizate of a mixture of butadiene-1,3 and styrene which comprises adding to the aqueous emulsion polymerizate an ammonium salt which frees acid in-situ in the presence of formaldehyde and adding formaldehyde to between 4.5 and 6.5 without irreversibly coagulating the same raising the pH to above 9 by addition of an alkali material selected from the group consisting of fixed alkalis, ammonia and volatile amines having boiling points below 160° C., and creaming with a vegetable mucilage.

5. The improvement in the creaming with a vegetable mucilage of an alkaline aqueous emulsion polymerizate of a mixture of butadiene-1,3 and a compound which contains a $CH_2=C<$ group and is copolymerizable with butadiene-1,3 which comprises adding to the aqueous emulsion polymerizate an ammonium salt which frees acid in-situ in the presence of formaldehyde and adding formaldehyde to reduce the pH of the aqueous emulsion polymerizate to between 4.5 and 6.5 without irreversibly coagulating the same and then raising the pH to above 9 by addition of an alkali material selected from the group consisting of fixed alkalis, ammonia and volatile amines having boiling points below 160° C., and creaming with a vegetable mucilage.

6. The improvement in the creaming with a vegetable mucilage of an alkaline aqueous emulsion polymerizate of a mixture of butadiene-1,3 and a compound which cointains a $CH_2=C<$ group and is copolymerizable with butadiene-1,3 which comprises adding ammonium chloride and formaldehyde to the aqueous emulsion polymerizate to reduce the pH of the aqueous emulsion polymerizate to between 4.5 and 6.5 without irreversibly coagulating the same and then raising the pH to above 9 by addition of dimethylamine, and creaming with a vegetable mucilage.

7. The improvement in the creaming with a vegetable mucilage of an aqueous emulsion polymerizate of a mixture of butadiene-1,3 and styrene which comprises adding to the aqueous emulsion polymerizate an ammonium salt which frees acid in-situ in the presence of formaldehyde and adding formaldehyde to reduce the pH of the aqueous emulsion polymerizate to between 4.5 and 6.5 without irreversibly coagulating the same and then raising the pH to above 9 by addition of a volatile amine having a boiling point below 160° C., and creaming with a vegetable mucilage.

8. The improvement in the creaming with a vegetable mucilage of an aqueous emulsion polymerizate of a mixture of butadiene-1,3 and styrene which comprises adding ammonium chloride and formaldehyde to the aqueous emulsion polymerizate to reduce the pH of the aqueous emulsion polymerizate to between 4.5 and 6.5 without irreversibly coagulating the same and then raising the pH to above 9 by addition of a volatile amine having a boiling point below 160° C., and creaming with a vegetable mucilage.

EDWARD C. SVENDSEN.

REFERENCES CITED

The following references are of record in the file of this patent:

UNITED STATES PATENTS

| Number | Name | Date |
| --- | --- | --- |
| 1,673,649 | Teague | June 12, 1928 |
| 1,754,842 | Traube | Apr. 15, 1930 |
| 1,872,161 | McGavack | Aug. 16, 1932 |
| 2,326,956 | Mack | Aug. 17, 1943 |
| 2,327,115 | Linscott et al. | Aug. 17, 1943 |

FOREIGN PATENTS

| Number | Country | Date |
| --- | --- | --- |
| 525,656 | Great Britain | Sept. 2, 1940 |
| 549,162 | Great Britain | Nov. 9, 1942 |

OTHER REFERENCES

India Rubber World, article by Mueller, vol. 107, pp. 34–35, October 1942.

Certificate of Correction

Patent No. 2,446,115.

July 27, 1948.

EDWARD C. SVENDSEN

It is hereby certified that error appears in the printed specification of the above numbered patent requiring correction as follows: Column 3, line 30, for the formula reading "R—$SO_2$—M" read R—$SO_3$—M; and that the said Letters Patent should be read with this correction therein that the same may conform to the record of the case in the Patent Office.

Signed and sealed this 12th day of October, A. D. 1948.

[SEAL]

THOMAS F. MURPHY,
*Assistant Commissioner of Patents.*